(12) United States Patent
Hampton et al.

(10) Patent No.: US 9,527,020 B2
(45) Date of Patent: Dec. 27, 2016

(54) FILTER CLEANING SYSTEM AND METHOD

(71) Applicant: Filtration Technology Corporation, Houston, TX (US)

(72) Inventors: John Hampton, Houston, TX (US); Greg Wallace, Houston, TX (US); James Harris, Houston, TX (US)

(73) Assignee: FILTRATION TECHNOLOGY CORPORATION, Houston, TX (US)

( * ) Notice: Subject to any disclaimer, the term of this patent is extended or adjusted under 35 U.S.C. 154(b) by 252 days.

(21) Appl. No.: 13/758,636

(22) Filed: Feb. 4, 2013

(65) Prior Publication Data

US 2013/0200006 A1 Aug. 8, 2013

Related U.S. Application Data

(60) Provisional application No. 61/594,544, filed on Feb. 3, 2012.

(51) Int. Cl.
| | | |
|---|---|---|
| *B01D 35/22* | (2006.01) | |
| *B01D 29/11* | (2006.01) | |
| *B01D 29/64* | (2006.01) | |
| *B01D 29/66* | (2006.01) | |
| *B01D 29/78* | (2006.01) | |
| *B01D 29/54* | (2006.01) | |

(52) U.S. Cl.
CPC ............ *B01D 35/22* (2013.01); *B01D 29/117* (2013.01); *B01D 29/6453* (2013.01); *B01D 29/661* (2013.01); *B01D 29/78* (2013.01); *B01D 29/54* (2013.01); *B01D 2201/081* (2013.01); *B01D 2201/087* (2013.01); *B01D 2201/54* (2013.01)

(58) Field of Classification Search
None
See application file for complete search history.

(56) References Cited

U.S. PATENT DOCUMENTS

| | | | | |
|---|---|---|---|---|
| 4,221,666 A | * | 9/1980 | Hedberg, Jr. ......... | B01D 29/39 210/236 |
| 4,284,500 A | * | 8/1981 | Keck ............................ | 209/250 |
| 4,906,357 A | * | 3/1990 | Drori ........................... | 210/143 |
| 5,268,095 A | * | 12/1993 | Barzuza ................. | B01D 29/01 210/143 |
| 5,482,063 A | * | 1/1996 | Miura ................... | B08B 9/0936 134/167 R |
| 8,157,925 B1 | * | 4/2012 | Templin .................... | 134/166 R |
| 2004/0000515 A1 | * | 1/2004 | Harris et al. ................. | 210/411 |
| 2005/0029204 A1 | * | 2/2005 | Schwartzkopf .............. | 210/793 |
| 2005/0133754 A1 | * | 6/2005 | Parsons .................... | E03D 1/36 251/129.17 |

FOREIGN PATENT DOCUMENTS

| | | |
|---|---|---|
| WO | WO2009/114128 | 9/2009 |
| WO | PCT/US13/24636 | 2/2013 |

* cited by examiner

*Primary Examiner* — Nicole Blan
(74) *Attorney, Agent, or Firm* — Boulware & Valoir

(57) ABSTRACT

The present invention discloses a system and method for self-cleaning filters without having to open the filter housing. Wash nozzles are integrated with the filter housings such that when the filters are clogged, both back-wash and regular washing can be performed with practically no down time. Moreover, without opening the filter housing, the hazardous components of the fluid to be filtered can be contained and dealt with before they escape the filter housing, thereby significantly reduces the environmental impact and harm to the working crew.

6 Claims, 8 Drawing Sheets

FILTER CLEANING SYSTEM AND METHOD

PRIOR RELATED APPLICATIONS

This invention claims priority to U.S. 61/594,544, filed on Feb. 3, 2012 and incorporated by reference in its entirety herein.

FEDERALLY SPONSORED RESEARCH STATEMENT

Not applicable.

FIELD OF THE DISCLOSURE

The disclosure generally relates to a system and method for self-cleaning a filter, and more particularly to a system and method for self-cleaning a filter with a nozzle integrated to the filter housing such that the filter can be cleaned without opening the filter housing.

BACKGROUND OF THE DISCLOSURE

Industrial filtration systems generally comprise multiple cartridge filters located within corresponding filter housings, and fluids to be filtered (influents) are supplied to the filter housings for the removal of debris, contaminants and particles. These cartridge filters generally have a cylinder shape with a hollow core. Influents are supplied to the hollow core and flowing outwards through the media of the cartridge filters, leaving debris, contaminants and particles at the surface of the media. After conducting such fluid processing for a period of time, the debris and particles will accumulate and clog the filter media, causing the drop of filter efficiency. In worse situations, a cake may aggregate at the inner surface of the filter cartridge and the filter will not function. Therefore, the cartridge must be cleaned and/or replaced after a period of operation. The cleaning of a filter generally involves shutting down the filtration operation, removing the cartridge, and manually spraying the surface to remove the residue so collected.

Another often performed filter cleaning procedure is called "backwash," where the fluid flow within the filter housing is reversed, and the accumulated debris and particles can be washed by the fluid and drained. However, such backwash procedure suffers a drawback in that the flow of the backwash fluid may not be strong enough to remove or blast the aggregated particulate material or debris on the filter.

WO2009114128 discloses a spraying device that can move along a filter surface to emit a jet of cleaning fluid to remove residue from the filter surface. Specifically, the nozzle can move along the length of a filter cartridge to spray the cleaning fluid at the surface of the cartridge. However, such design fails to take into consideration the possible liquid/gas escape during cleaning, which may cause health and environmental concern when the influent contains hazardous components. Furthermore, the design cannot be used with a backwash cycle to improve the cleaning efficiency.

Therefore, there is a need for a filter cleaning apparatus and method that is also able to work in combination with a backwash operation to improve the cleaning efficiency.

SUMMARY OF THE DISCLOSURE

The present invention relates to an apparatus for cleaning a filter within a filter housing without the need to first remove the filter from the filter housing. Specifically, the present invention discloses a wash nozzle integrated with the filter housing in a cylinder mounted on the filter housing so that the cylinder can move the wash nozzle up and down inside the filter housing within the hollow core of the filter cartridge. Moreover, the wash nozzle is connected to a source of wash fluid through a wash pipe, which is concentrically surrounded by a purge pipe that connects to a drain for purging the fluid and debris during backwash stage. A gas injection inlet is also provided for introducing a pressurized gas that causes turbulence inside the filter housing to "bubble off" (dislodge) the accumulated solids on the filter, especially the inner surface of the hollow core. A purge inlet is provided near the wash nozzle. Sealing mechanism is provided in the system especially where the cylinder is connected to the filter housing to prevent leaking that hinders regular filtration operation.

The present invention also provides a method for self-cleaning a filter cartridge within a filter housing without opening the filter housing. A wash nozzle is integrated to the filter housing by a cylinder, a gas injection inlet is provided on the filter housing, and the method comprises closing the fluid inlet by terminating the fluid inlet to the inlet housing; closing the drain to the filter housing so that the filter housing is filled with fluid; initiating a back-wash by introducing a high-pressure gas into the interior of the filter housing through the gas injection inlet at a pressure capable of creating turbulence that will dislodge particulate matter or debris from the core of the filter while positioning the wash nozzle at proper location inside the filter housing; and forcing the fluid out of the filter housing with the gas whereby the particulate matters from the interior of the filter cartridge is purged from the filter housing through the purge pipe near the wash nozzle.

This invention also provides a method for self-cleaning the filter cartridge without opening the filter housing, in which the filter cartridge has a hollow core and the filter housing further comprises a fluid inlet connected to the hollow core, and a wash nozzle and wash pipe mounted on the filter housing capable of traveling through the hollow core of the filter cartridge. The method comprises the steps of: closing the fluid inlet to the filter housing, washing the filter cartridge by spraying a high-pressure wash fluid from the wash nozzle to break the particulate build-up on the hollow core; and draining the wash fluid and debris from the fluid inlet by switching on a drain valve fluidly connected to the fluid inlet, wherein the drain valve directs the fluid from the fluid inlet to a drain pipe.

A processor with sensors can detect pressure build up within the filter housing to determine the initiation of the self-cleaning process. A processor can control the backwash and washing process using sensors to detect fluid levels and operation of the apparatus.

As used herein, a "pressurized gas" means a gas having a pressure equal to or greater than 20 psi. The exact pressure used may be adjusted based on system design and depending upon the type of particulate matter or debris being filtered, but in any case sufficient to dislodge particulate matter or debris from the filter core.

As used herein, a "high-pressure fluid" means a fluid sprayed by the nozzle at a pressure equal to or greater than 100 psi. The exact pressure used may be adjusted based on system design and depending upon the type of particulate matter or debris being filtered, but in any case sufficient to clean the inside of the filter core.

As used herein, "influent" means the fluid to be introduced to and filtered by the filter.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

DETAILED DESCRIPTION

Figure 1:
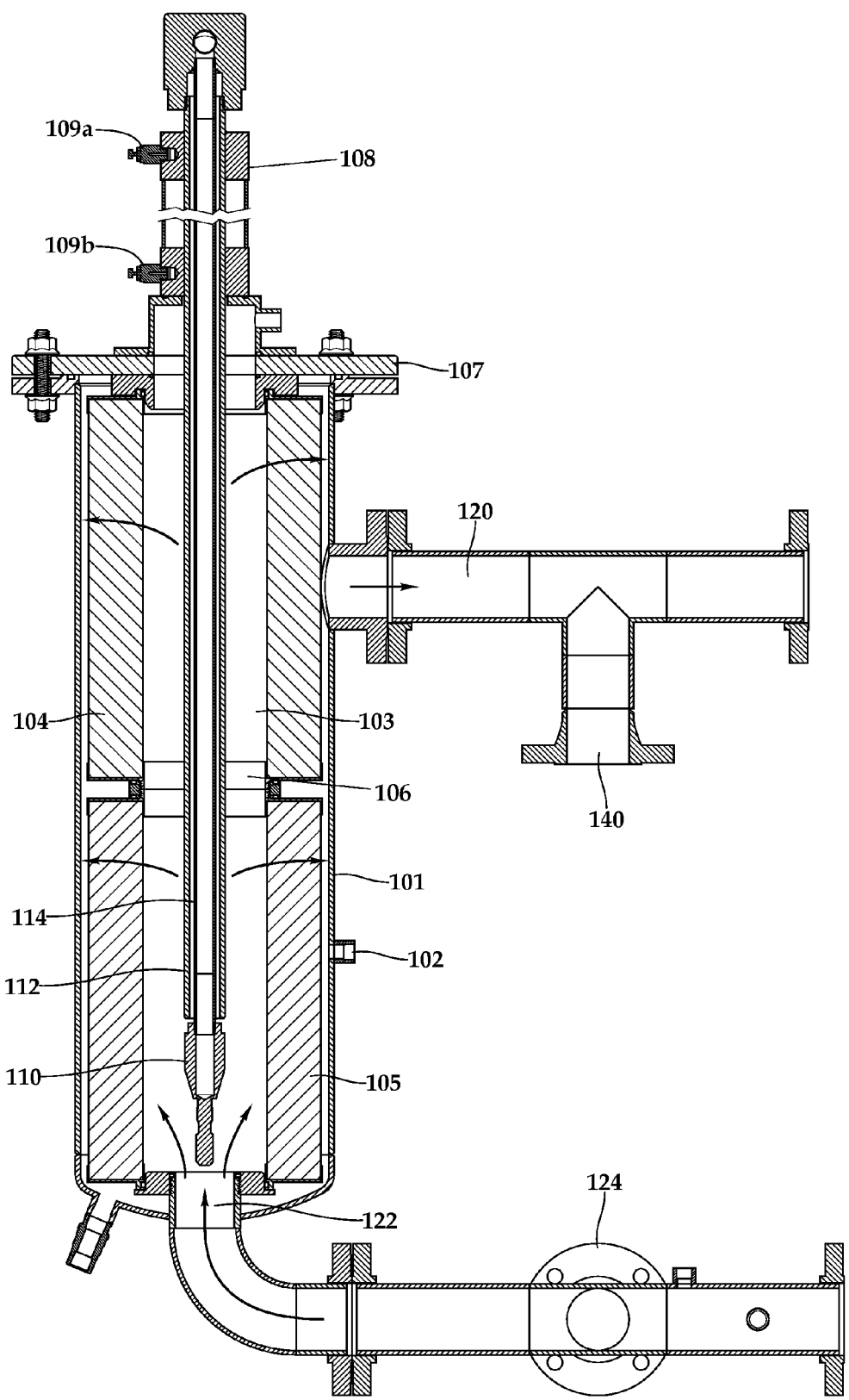
FIG. 1 is a cross-section of the filter housing and the placement wash nozzle assembly during filtration stage with the arrows indicating flow during filtration.

The invention is a novel system and method for self-cleaning filter cartridges without opening the filter housing. In one aspect of this invention, a system is provided for cleaning a filter cartridge located within a filter housing, the filter cartridge having a hollow core, the system comprising: a) a wash nozzle integrated in a filter housing, the wash nozzle on a movable cylinder mounted on top of the filter housing, wherein the wash nozzle is fluidly coupled to a source of wash fluid through a wash pipe located in the cylinder within the hollow core of the filter cartridge and capable of moving vertically within the hollow core by raising and lowering the cylinder; b) a purge pipe concentrically surrounds the wash pipe and forms a purge inlet to form an annular space around the wash pipe capable of fluid travel and terminates near the wash nozzle; c) the filter housing having a fluid inlet for introducing a fluid to be filtered, and a fluid outlet for draining filtered fluid, wherein the fluid inlet is fluidly coupled to the hollow core of the filter cartridge; and d) a processor controlling the movement of the wash nozzle.

In another aspect of this invention, there is provided a method for self-cleaning a filter cartridge located within a filter housing without opening the filter housing, the filter cartridge having a fluid outlet, a hollow core fluidly connected to a fluid inlet of the filter housing, a gas injection inlet, and a wash nozzle and purge pipe mounted on the filter housing in a cylinder on top of the filter housing, the method comprising the steps of: a) terminating the fluid inlet to the filter housing; b) closing the fluid outlet to the filter so that the filter housing is filled with fluid; c) placing the wash nozzle and the purge pipe at the top of the filter housing; d) initiating a back-wash by introducing a high-pressure gas into the interior of the filter housing; and e) forcing the fluid out of the filter housing with the gas with particulate matter from the interior of the filter cartridge through the purge pipe.

In yet another embodiment of this invention, there is provided a method for self-cleaning a filter cartridge located within a filter housing without opening the filter housing, the filter cartridge having a hollow core, the filter housing having a fluid inlet for introducing the influent, and a wash nozzle and wash pipe mounted on the filter housing capable of traveling through the core of the filter cartridge, the method comprising the steps of: a) closing the fluid inlet to the filter housing; b) washing the filter cartridge by spraying a high pressure wash fluid introduced through the wash nozzle to break the particulate build-up on the hollow core; and c) draining the wash fluid and debris from the filter housing through the filter inlet.

In still another aspect of this invention, there is provided a method for self-cleaning a filter cartridge located within a filter housing without opening the filter housing, the method comprising the steps of: a) closing a fluid inlet to the filter housing so that the filter housing is substantially full of fluid; b) gradually introducing pressurized gas into the filter housing such that the gas creates turbulence that will dislodge particulate matter from the interior of the filter core; c) backwashing the filter core by purging the fluid inside the filter housing and the dislodged particulate matter by providing a purge exit from the filter housing utilizing the force of the pressurized gas; d) terminating the backwashing by ceassation of introduction of pressurized gas in the filter housing and closing the purge exit; e) washing the filter cartridge by spraying a high-pressure wash fluid to the interior of the filter core to remove any additional particulate matter; and f) draining the wash fluid with any particulate matter from the filter housing.

In one embodiment, the purge pipe is not in fluid communication with the wash pipe, and the purge pipe is fluidly connected to a purge drain pipe.

In one embodiment, the fluid inlet is connected to an inlet valve and a drain valve, both of which are operably connected to the processor, which controls the opening and closing of the valves. The fluid outlet is fluidly connected to an outlet valve that is also controlled by the processor.

In one embodiment, the fluid housing further comprises a gas injection inlet for introducing a pressurized gas, which creates turbulence in the filter housing and forces the fluid through the annular space between the wash pipe and the purge pipe.

In one embodiment, the method also includes detecting the pressure difference during the filtration process to determine when to start the self-cleaning method when the pressure difference reaches a predetermined value. The method also includes detecting the fluid level inside the filter housing and lowering the purge pipe at a position below the fluid level inside the filter cartridge as the fluid is forced out of the filter housing.

In one embodiment, the method also includes, during backwash, moving the wash nozzle from the top to the bottom of the filter housing when purging fluid, thereby completing a backpulse. The method also includes, during washing, moving the wash nozzle from the bottom to the top of the filter housing and then back to the bottom, thereby completing a wash stroke. In one embodiment, the number of backpulses and wash strokes is preselected depending on the degree of clogging and the nature of the deposited particulate matter.

From here on, detailed explanation of the system and method of this invention will be made with reference to the drawings. The following examples are intended to be illustrative only, and not unduly limit the scope of the appended claims.

Referring to FIG. 1, which shows the wash nozzle assembly 110 integrated with a filter housing 101. Filter cartridges 104, 105 are located within the filter housing 101, although more than two cartridges can be used. Also, if desired only one cartridge can be used. The filter cartridges have connected hollow core 103 that is fluidly coupled with a fluid inlet 122 at the bottom of the filter housing 101. The filter cartridges are connected with a fluid tight seal 106. The fluid inlet 122 is further connected to an inlet valve 124 and a drain valve (not shown). During filtration stage, the inlet valve will open to allow a fluid to be filtered being supplied to the filter through the fluid inlet 122. During washing stage, as discussed later, the drain valve will open such that the wash fluid and debris can be drained through the fluid inlet.

The filter housing further comprises a fluid outlet 120, which is further connected to an outlet valve (not shown). During the filtration stage when the fluid enters core 103 under pressure, the outlet valve is open such that the filtered fluid can exit the filter housing through the fluid outlet 120.

The wash nozzle 110 is integrated with the filter housing through a cylinder 108 mounted on the top cover 107 of the housing 101. The wash nozzle 110 is coupled to a wash tube 114 that is concentrically surrounded by a purge tube 112. Both the wash tube 114 and purge tube 112 are fixed to the top of cylinder 108, such that the cylinder can move with the wash nozzle along the hollow core 103. The cylinder is preferably pneumatically operated, with the pneumatic fluid supplied to the cylinder. In FIG. 1 two pneumatic fluid inlets 109a, 109b are shown.

Figure 2:
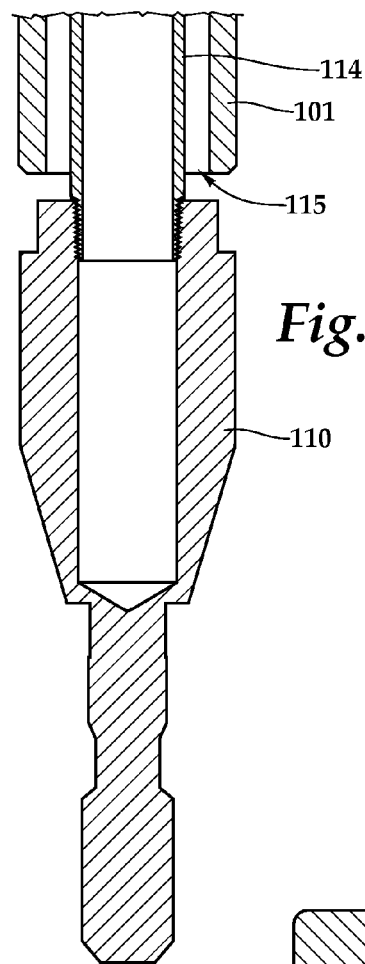
FIG. 2 is a detail cross-sectional view of the purge inlet near the wash nozzle.

Details of the wash nozzle are shown in FIG. 2, to further illustrate the annular purge inlet 115 near the wash nozzle 110. As discussed above, the wash nozzle 110 is connected to a wash pipe 114 that is surrounded by a purge pipe 112. Toward the nozzle 110, the purge pipe 112 is a bit shorter than the wash pipe 114 such that an annular opening 115 is present that serves as a purge inlet during back-washing stage. It is noted that the annular space between the wash pipe 114 and purge pipe 112 is not in fluid communication with the core of wash pipe 114 such that the fluid in each space will not be mixed.

Figure 3:
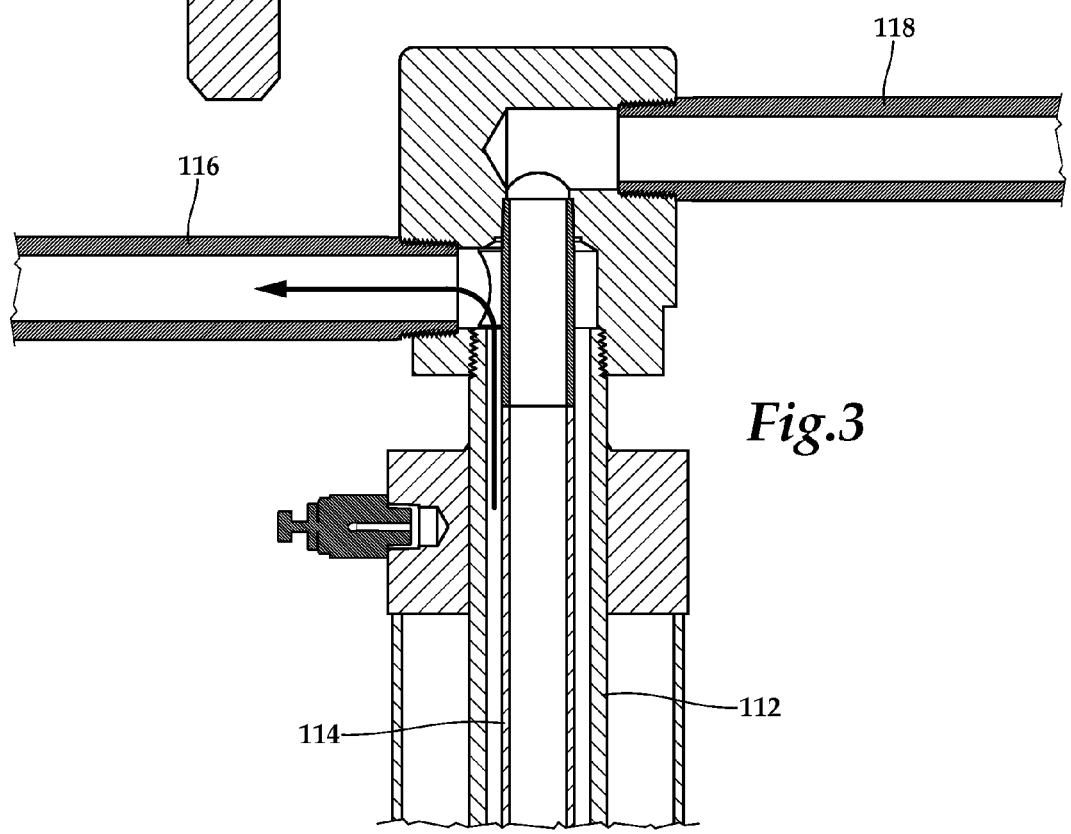
FIG. 3 is a detail cross-sectional view of the top of the wash pipe assembly showing the purge pipe and the wash pipe connections.

Also referring to FIG. 3, which shows the downstream/upstream piping connection for purge pipe 112 and wash pipe 114. As shown in the figure, wash pipe 114 is connected to a path 118 that further connects to a wash fluid valve (not shown) and a wash fluid source. The purge pipe 112 is connected to a purge path 116 that further connects to a purge valve and a drain pipe. The functionalities of these pipes and valves will be discussed in further detail below.

Referring back to FIG. 1, the filter housing 101 also comprises a gas inlet 102 for introducing high-pressure air or gas during the back-wash stage. As shown in the figure, the wash nozzle 110 rests at the bottom of the filter housing inside the hollow core. This is the preferred position for the wash nozzle 110 during especially the filtration stage, because the cylinders are in the lowered, more stable position.

The system further comprises a processor (not shown) for controlling all the valves, the movement of the wash nozzle, and the gas injection. The system also comprises fluid level sensors for detecting the fluid level inside the filter housing, pressure sensors for detecting the pressure difference between the inside and outside of the filter cartridge, and position sensors for detecting the position of the wash nozzle. These sensors are also operably connected to the processor. The embodiments of the features are well known in the art and discussed below in detail of the operation.

Figure 6A:
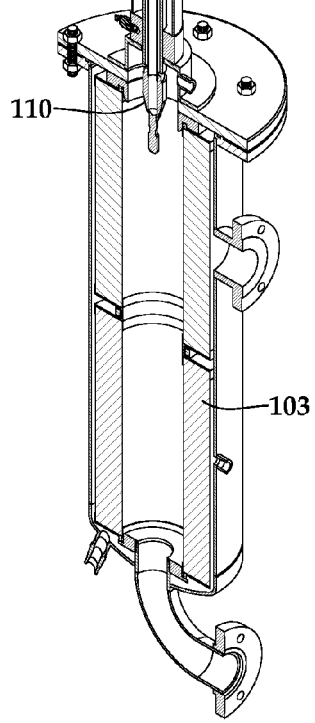
FIG. 6A is a schematic cross-sectional view of the system where the cylinder is fully extended and the wash nozzle is at the top of the filter housing and 6B is a schematic cross-section with cylinder in the down position.
Figure 6B:
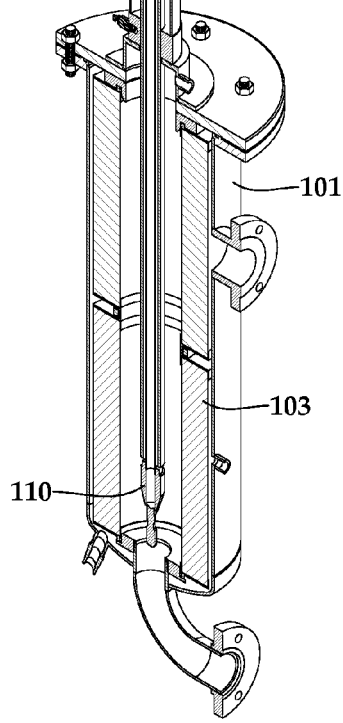

Referring to FIG. 6A, which shows the cylinder 150 fully extended and the wash nozzle 110 is therefore at the top of the filter housing 101 within the hollow core 103. In FIG. 6B, the cylinder 150 is fully refracted and the wash nozzle 110 is therefore at the bottom of the filter housing 101 within the hollow core 103. The cylinder is preferably pneumatically operated with seals (not shown) preventing the gas and/or fluid from escaping the filter housing.

With configuration of the present invention, especially the feature that the wash nozzle is integrated within the filter housing, whenever a cleaning of the filter cartridge is necessary, there is no need to open the housing and remove the filter cartridge for cleaning as conventional design, which would cause significant downtime for the filtration operation and increase and operational cost. As explained below, the backwash and washing stages of the present invention ensures the satisfactory cleaning without the downtime. Furthermore, in the case where the fluid to be filtered contains hazardous gas or particles, such as greenhouse gases, the present invention effectively prevents those gases or particles from escaping the filter housing into the atmosphere. This feature has significant application for a greener and safer environment.

Filtration Stage

Referring back to FIG. 1, which shows the filter system of the present during regular filtration operation. The processor opens the inlet valve 124 such that the fluid to be filtered can enter the filter housing through the fluid inlet 122. The arrows indicate the direction of the fluid to be filtered. After the fluid enters the filter housing, it will flow radically outward from the hollow core 103 to pass through the filter medium 105. As noted above, the wash nozzle 110 is lowered to the bottom of the filter housing for better stability.

The particles or other impurities in the fluid cannot pass through the filter medium 105 and therefore remain on the surface of the hollow core 103. After filtering for a period of time, the accumulated particles and impurities aggregate to block and clog the available passageway for fluid in the filter. As clogging worsens, the pressure difference between the hollow core and outside of the filter will increase, and when the pressure difference reaches a detectable predetermined maximum, self-cleaning can be activated.

Back-Wash Stage

Figure 4C:
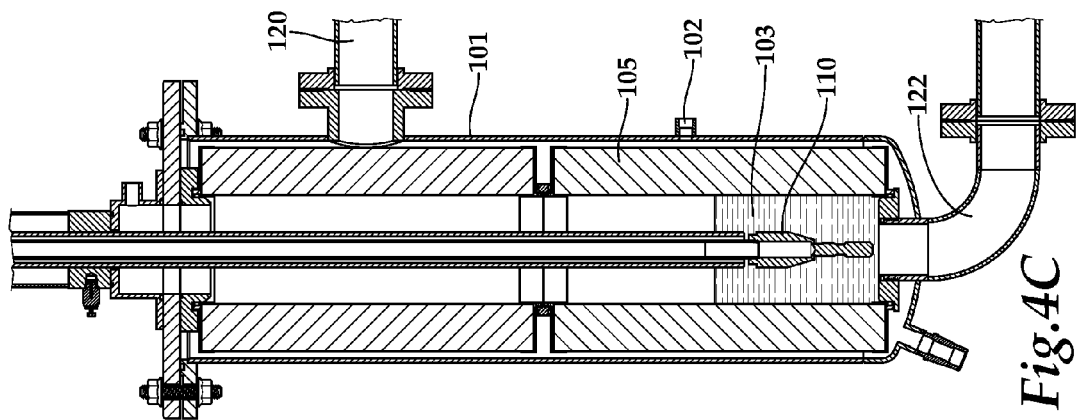
FIGS. 4A-C are cross-sectional views of the backwash stages.
Figure 4B:
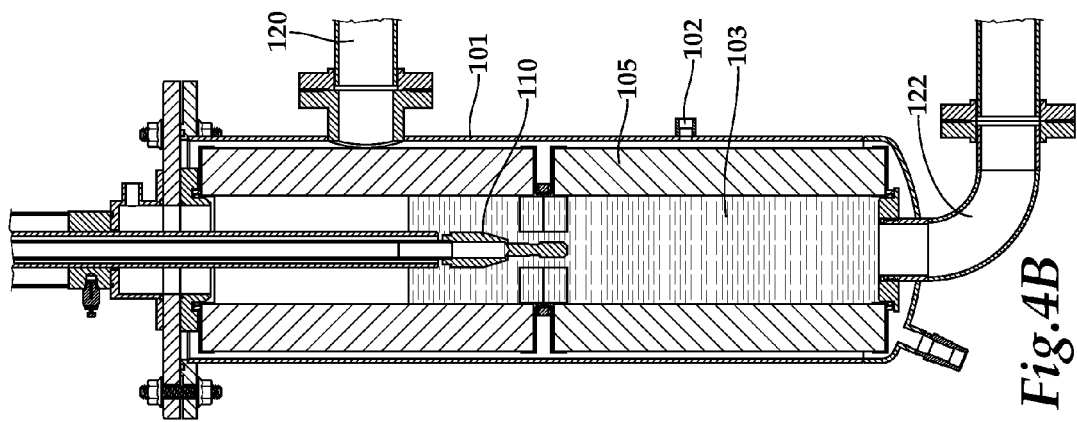
Figure 4A:
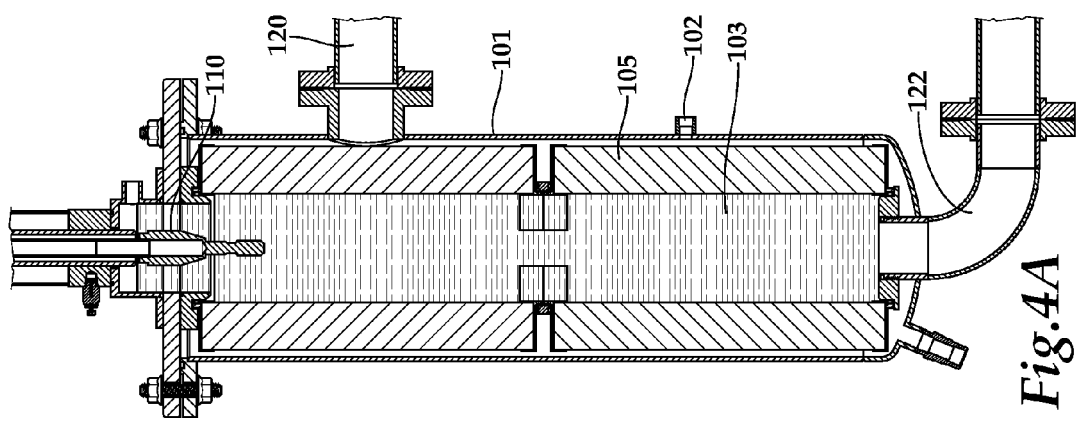

Referring now to FIGS. 4A-C, which illustrates the back-wash stage of the present invention. It is called the "back-wash" because the fluid is now flowing in the direction opposite to the filtration stage. The fluid inlet 122 from the filter housing is closed, as is the fluid outlet for filtered fluid. Referring to FIG. 4A, which shows the beginning of the back-wash stage. As shown in the figure, the wash nozzle 110 is first raised to the top of the filter housing 101, while the filter housing is filled with air through inlet 102 and creates pressure and turbulence on the fluid inside the filter. This forces fluid and particles from the inside of the filter through the annular purge inlet 115 and out of the purge pipe 116 as discussed below. The position sensor and fluid level sensor detects the position of the wash nozzle 110 and the fluid level inside the filter housing, respectively. The processor ensures that the wash nozzle 110 and the purge inlet 115 stays below the fluid level during the backwash stage. In this embodiment the wash fluid is water, but other wash fluids are possible, depending on the accumulated solids to be cleaned.

High pressure air is then injected into the filter housing through the gas inlet 102. Although in this embodiment air is used, other high-pressure gas can also be used. The high pressure air will cause violent turbulence in the water inside the filter housing, especially in the hollow core, and thereby knocking off a portion of solids accumulated on the inner surface of the hollow core. At the same time, the processor will open the purge valve that connects to the purge pipe 112 and the purge inlet 115, thereby providing a low pressure exit. The high pressure air and the turbulent water will naturally flow to the low pressure exit, and thereby drain by the purge pipe.

As shown in FIG. 4B, the water level drops with the water being drained through the purge pipe. The injection of high pressure air continues and further removes solids accumulated on the hollow core. The empty space above the water level will be occupied by high pressure air which further pushes the water to leave through the purge pipe. FIG. 4C shows that the water level continues to drop. The back-wash stage will complete when the position sensor senses that the wash nozzle reaches the bottom of the filter housing. At that point the processor will stop air injection and close the purge valve.

Washing Stage

Figure 5A:
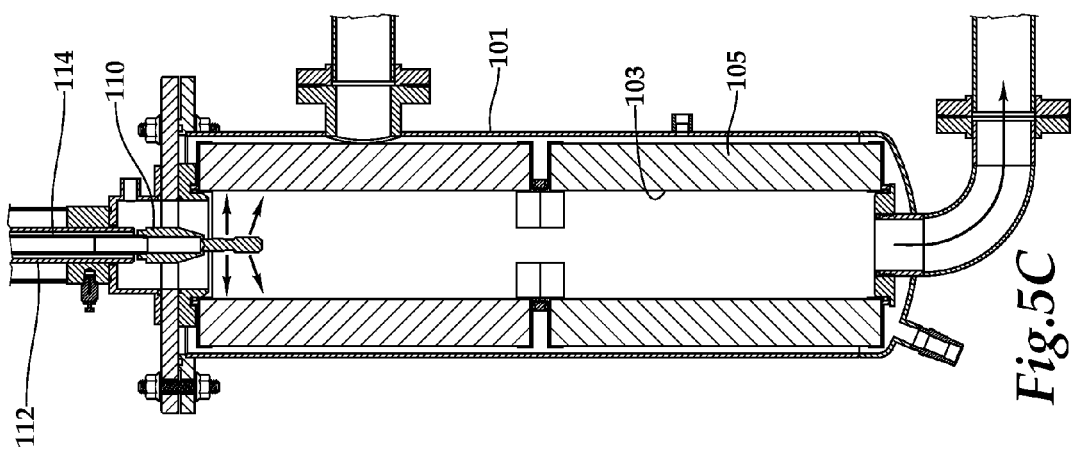
FIGS. 5A-C are cross-sectional views of washing stages.
Figure 5B:
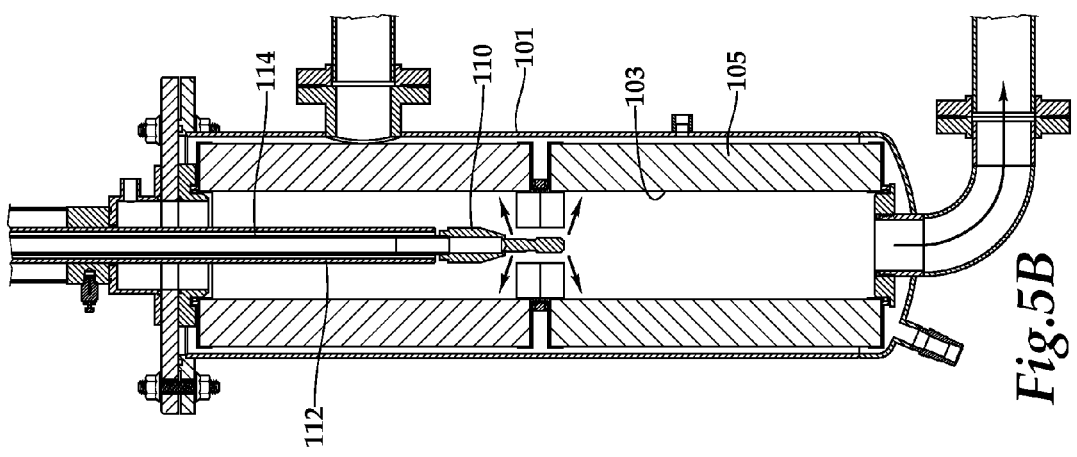
Figure 5C:
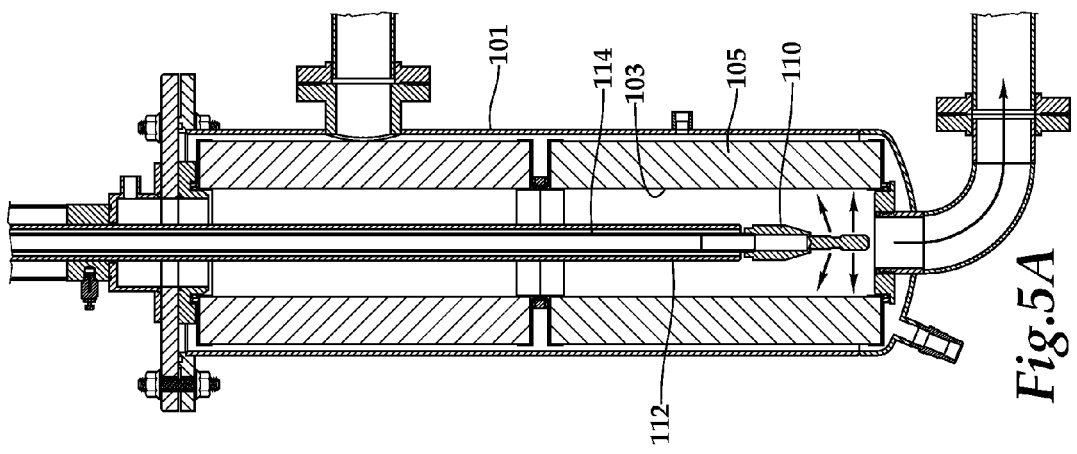

Referring to FIGS. 5A-C, which shows the washing stage of the present invention. Generally speaking in the washing stage the wash nozzle 110 will travel from bottom to the top of the filter housing and then travel back down to the bottom to complete a "stroke." However, multiple strokes of moving up and down the filter housing may also be preferred if that enhances the cleaning efficiency. Referring to FIG. 5A, which shows the start of the washing stage. The processor opens the wash valve and the discharge valve (both not shown for well known in the field) such that high-pressure wash fluid is supplied to the nozzle 110 through wash line 118, and the pressurized sprays the interior hollow core to remove any additional particulate accumulated. The processor also opens the drain valve for draining the water and debris through the fluid inlet. As shown in FIG. 5B, the processor controls the cylinder such that the wash nozzle 110 gradually moves up the filter housing 101 along the hollow core 103 while spraying high pressure water to continuously break down the accumulated solids. As shown in FIG. 5C, half of the washing stage cycle is marked by once the position sensor detects that the wash nozzle 110 reaches the top of the filter housing 101. The processor then brings the wash nozzle 110 gradually down to the bottom, while still spraying. This cycle, beginning from the wash nozzle 110 from the bottom to the top and back to the bottom of the filter housing, is called "one stroke." If an operator determines that one stroke is sufficient to clean the hollow core of the filter cartridge, the washing stage ends and the processor then closes the wash valve, the discharge valve and the drain valve. If, however, the operator determines that more strokes of washing are required, for example because the accumulated solids are stubborn to be removed, then a stroke counter will add "1" after each stroke and the washing stage will not stop until the stroke count reaches what the operator sets.

Employing the System in Two or More Filters

Figure 7:
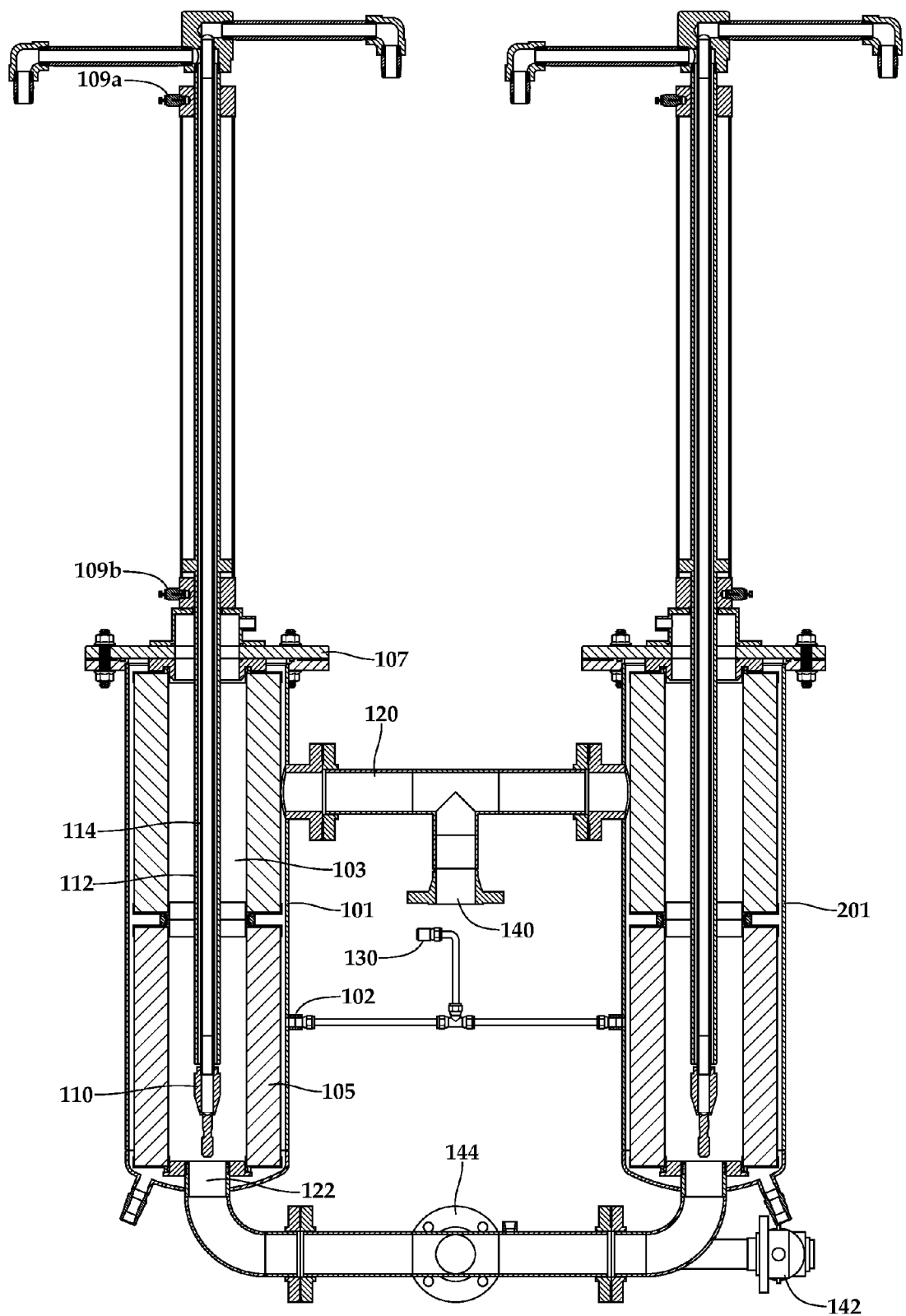
FIG. 7 is a cross-sectional view of the present invention being used in two or more filter housings and wash assemblies.

Referring now to FIG. 7, which shows the system being employed in two parallel filters. It is to be noted that the system can be employed in an array of filters by the same configurations, and it is for simplicity purpose to show only two filters. In this figure, two filter housings 101, 201 are joined together, and most configurations are the same as in FIG. 1, except that the fluid inlets from both housings are jointly controlled by the same inlet valve 144 and drain valve 142, the fluid outlets from both housings are jointly controlled by the same outlet valve 140, and the gas injection inlets are jointly controlled by the same gas injection valve 130. This way, the filtration, backwash and washing stages are activated and controlled together by the same processor for both filters. By this pairing up configuration, the self-cleaning system and method of this invention can easily be employed for an array of filters.

Method of the Self-Cleaning Method

Figure 8A:
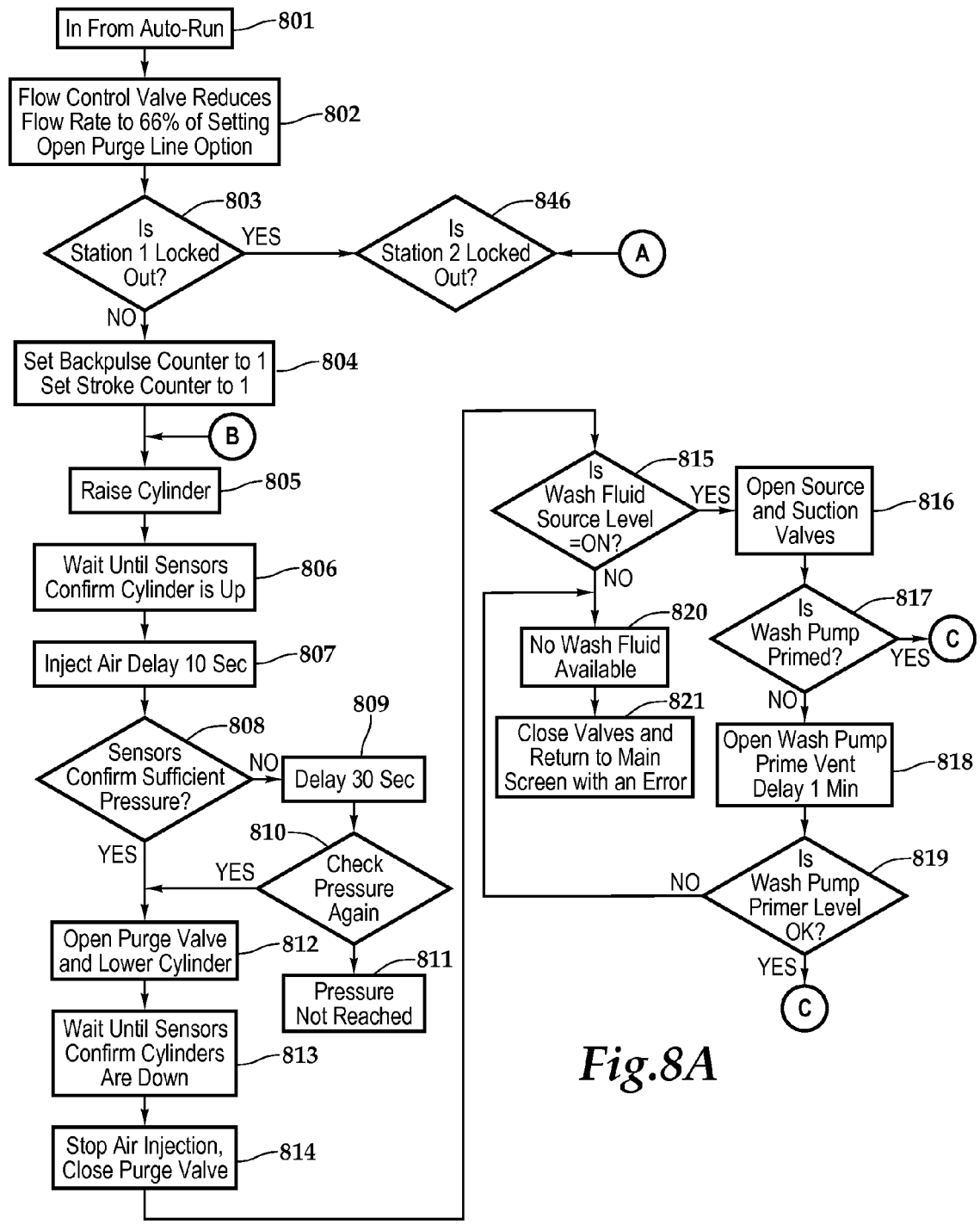
FIGS. 8A-B combined are a flow chart illustrating the basic logics of the method of this invention.
Figure 8B:
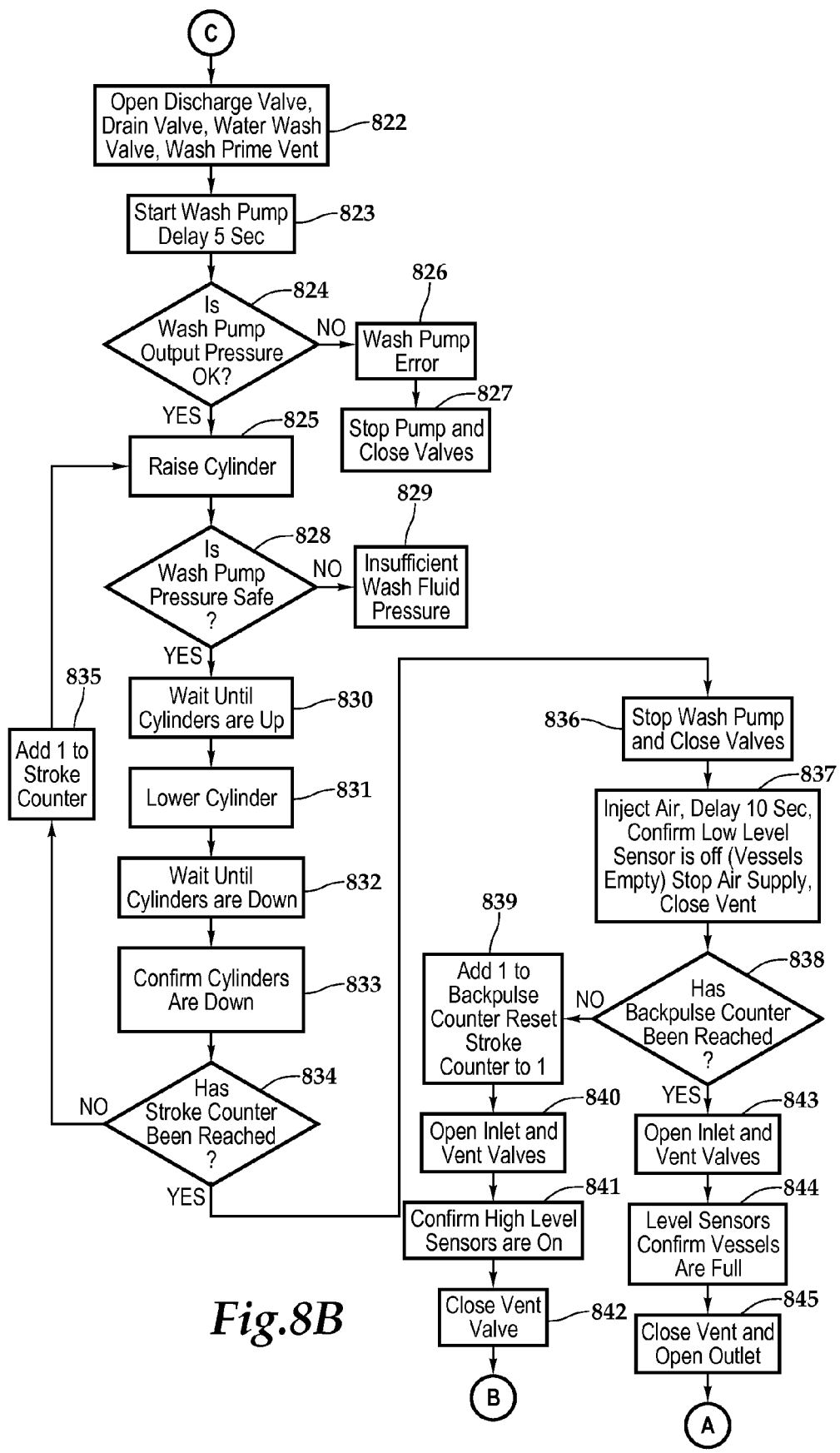

Referring now to FIGS. 8A and 8B, which combined shows the basic logics of the filter self-cleaning method of the present invention. In step 801, the system is activated in auto-run mode, and the processor will execute a predetermined plan for self-cleaning, including the backwash stage and washing stage. In step 802, the processor reduces the flow rate to 66% (2/3) of normal setting by partially closing the inlet valve. This is done especially in the filter array setting where some filter housings are undergoing self-cleaning, and the flow rate is therefore reduced for other on-line filters in order not to overload them. The number is variable depending on the settings and actual conditions. In step 803, the processor will determine whether the current station (station 1) is locked out. This means that any command sent to the filter station will be ignored. The station has to be locked out before the self-cleaning can begin and there will be no filtration, back-wash or washing at this step. If station 1 is locked out, the system proceeds to step 846, where the processor will determine if the next available filter station 2 is locked out. This is because the system is configured such that lock-out only occurs when a problem exists in the filter housing, which makes it unable to take command until the problem is fixed. But if station 1 is not locked out, the system proceeds to step 804. With regard to the current station 1, step 846 is a place holder in the logic, as is station 2.

In step 804, the operator will determine the number of backpulse and strokes to be performed in the self-cleaning cycle. A backpulse is one round of backwash, meaning the wash nozzle 110 travels in the backwash step shown in FIGS. 4A-C from top to bottom once and stops. A stroke is one round of washing, meaning the wash nozzle 110 moving from the bottom of the filter housing to top and back to the bottom. The number of backpulse and stroke may vary, depending on how clogged the filter is or the nature of the solids. If the filter is very clogged or the accumulated solids are known to be hard to break, the operator may choose to perform more than one backpulse or more than one stroke for the cleaning cycle. Whether the predetermined number of backpulse/stroke has been performed will be tracked by the backpulse counter and the stroke counter later in the cycle.

Steps 805 to 814 are related to the backwash stage as illustrated in FIGS. 4A-C. In step 805, the cylinder is raised to move the wash nozzle to the top of the filter housing in preparation of the backwash purge. In step 806, the position sensor will confirm that the cylinder (and the wash nozzle) is raised to the top of the filter housing. In step 807, the system starts preliminarily inject air through the gas injection inlet for 10 seconds, so as to build up sufficient air pressure inside the housing, and then in step 808 the gas pressure sensor will determine whether the gas pressure within the housing is sufficiently high. As discussed above, the gas pressure is important both to create violent turbulence in the fluid to break off the solids, and also pushes the fluid toward the purge pipe. Typically the system will determine a 25 psi gas pressure to be sufficient, but it can vary depending on different system requirement, for example in some instance 20 psi may be sufficiently high for backwash to proceed. If in step 808 the processor determines that the pressure is high enough, the system proceeds to step 812. If in step 808 the system determines that the gas pressure is not high enough, in step 809 the system will continue the preliminary air injection for another 30 seconds, and check the pressure again in step 810. If the pressure is still not reached, the self-cleaning cycle may be terminated due to the loss of air pressure from external air supply, and the process cannot continue until the problem is addressed. If the pressure is sufficiently high, the system will proceed to step 812, where the processor will open the purge valve for draining the fluid within the filter housing, and gradually lower the cylinder to keep the wash nozzle and purge inlet below the fluid level for purging the fluid through the purge inlet and purge pipe. In step 813, the position sensor will confirm that the cylinder and thus the wash nozzle are down to the bottom of the filter housing to complete one "backpulse," and in step 814 the processor stops the air injection and closes the purge valve.

Steps 815 to 821 are preparation for washing stage. In step 815, a fluid level sensor at the wash fluid source detects whether enough wash fluid is present. If there is, the system proceeds to step 816, and if not the system proceeds to step 820, where the processor determines that no wash fluid is available, and closes all the valves and returns to the main screen with an "error warning" in step 821. In step 816, where previously determined that sufficient fluid is available, the processor will open the source and suction valves near the fluid tank. This is simply a designer's choice to have more than one fluid tank as the fluid source, and each tank has its own source and suction valve for proper fluid supply. For example, if one fluid tank is low in reserve the system can switch to the other fluid tank for washing while the first tank is filled up. Alternatively, the system can be equipped with one larger fluid tank that will not be depleted. Or in another embodiment, the wash fluid is supplied from the already filtered fluid from other filters in the filter array such that continuous and replenishing supply of wash fluid can be accomplished. In step 817, the system will determine whether the wash pump is primed, and if it is the system proceeds to step 822, but if not the system proceeds to step 818. By "primed" it means that there is sufficient fluid in the pump for proper fluid supply, and that there is no air present in the pipelines, because air will cause pressure drop in the pump, which in turn results in insufficient pumping. If the system determines that the wash pump is not primed, the system proceeds to step 818, where the wash pump prime vent will be opened for 1 minute to vent off the existing air in the wash pump and continues to prime the pump. In step 819 the system will check the wash pump primer level again, and if it is satisfactory, the system proceeds to step 822. If the primer level of the wash pump is still not high enough, it means no wash fluid is available in step 820, and the processor closes all valves and return to main screen with an "error" warning in step 821.

Steps 822 to 834 discuss the washing stage, especially one "stroke" of washing. In step 822, the processor opens the discharge valve near the wash pump, the drain valve connected to the fluid inlet, the water wash valve and the wash prime vent. As discussed above, the discharge valve is the result of having two alternate fluid tanks, and may be omitted if only one fluid tank is used. The wash prime vent is a vent for excluding air from the wash pump. When all valves are opened, the wash prime vent is closed to prevent air from entering the wash pump. The system then proceeds to step 823 to start wash pump for 5 seconds for the wash fluid to fill up the pipelines. In step 824, the system checks the output pressure of the wash pump. If the output pressure is not enough, the system proceeds to step 826 with a wash pump error, and stops the pump and closes all valves in step 827. The self-cleaning cycle will be terminated. If the output pressure is sufficient in step 824, the system proceeds to step 825, where the cylinder and thus the wash nozzle will be gradually raised while spraying high-pressure wash fluid to the surface of the hollow core to break off the solids. The sprayed wash fluid and debris is drained through the fluid inlet.

During this washing stage, the wash pump pressure is still continuously checked in step 828, and if insufficient pressure is found in step 829, the cycle is again terminated. If the system determines that the pump pressure is sufficient, in step 830 the position sensor determines whether the cylinder and wash nozzle are all the way to the top of the filter housing. Once reaching the top of the filter housing, the processor lowers the cylinder and the wash nozzle while continuously spraying high-pressure wash fluid to the surface of hollow core. The entire stroke is completed when the cylinder and wash nozzle is at the bottom of the hollow core in step 832, and the processor will confirm that the cylinder and wash nozzle are down in step 833. In step 834, the processor determines whether the predetermined number of strokes has been reached, and if not, the processor will add "1" to the stroke counter and starts over from step 825 to run another stroke. If, however, the predetermined number of strokes is reached, the system proceeds to step 836 where the wash pump is stopped and all valves are closed except for the drain valve.

In step 837, additional air is injected for 10 seconds to push any remaining wash fluid and debris down the fluid inlet. Then, the system confirms that low level sensor is off, which means that the filter housing is now empty. Then air injection is stopped, and the drain valve is closed.

In step 838, the processor determines whether the predetermined number of backpulse has been reached. If not, in step 839 the processor adds "1" to the backpulse counter, and reset the stroke counter to 1 for the next cycle. Then in step 840 the processor opens the fluid inlet and vent valves to re-fill the vessels to get ready for the next round of backwash. In step 841, the system confirms that the high fluid level sensors are on, which detect the fluid level inside the filter housing. At this stage water is introduced into the filter housing through the fluid inlet and fill up the filter housing before the air is injected. The air originally existed in the filter housing leaves through the vent. In step 842, the filter housing is full of water, and the processor closes the vent valve, and the system is now ready for another round of backwash and wash.

In step 843, the system opens the fluid inlet and the system vent, readying the filter housing to be filled. The fluid to be filtered will be introduced through the fluid inlet, until in step 844 the level sensors confirms that the filter housing is full, i.e. the high level sensor in the filter housing is on, while the air leaves through the system vent. The processor then closes the vent and open the fluid outlet, and the filtration can begin.

Based on the discussion above, the self-cleaning filter system and method can clean the filter without opening the filter housing. This significantly reduces the cost for cleaning the filters because there is practically no down time comparing to conventional cleaning because the time for the self-cleaning backwash and washing cycles is minimal compared to shutting down the whole filter, open the filter housing, manually remove the filter and clean it and then put it back. In addition, in an array of filter housings having the self-cleaning apparatus of the present invention, most filters in the array can continue the filtration operation while some filters are being cleaned by the self-cleaning apparatus and method, thereby maintaining the operation output for the array. More importantly, the self-cleaning system assures that the hazardous gases from the filtration process do not escape to the atmosphere and do not harm the working personnel or environment.

What is claimed is:

1. A system for cleaning a filter cartridge located within a filter housing, the filter cartridge having a hollow core, the system comprising:
   a) a wash nozzle capable of spraying a high-pressure fluid of at least 100 psi and integrated in a filter housing having a position sensor for detecting positions of said wash nozzle, and a pressure sensor for detecting pressure differences across the filter cartridge; said wash nozzle on a movable cylinder, said cylinder mounted on top of the filter housing, wherein the wash nozzle is fluidly coupled to a source of wash fluid through a wash pipe located in the cylinder within the hollow core of the filter cartridge and capable of moving vertically within the hollow core by raising and lowering the cylinder;
   b) a purge pipe concentrically surrounds the wash pipe and forms a purge inlet to form an annular space around the wash pipe capable of fluid travel and terminates near the wash nozzle;
   c) the filter housing having a fluid inlet for introducing a fluid to be filtered, a fluid outlet for draining filtered fluid, and a fluid level sensor detecting the fluid level inside the filter housing, wherein the fluid inlet is fluidly coupled to the hollow core of the filter cartridge; and
   d) a processer operably coupled with said fluid level sensor, said position sensor and said pressure sensor for receiving fluid level information from said fluid level sensor, determining the position of said wash nozzle, and controlling the movement of the wash nozzle such that when purging fluid said purge inlet is continuously maintained at a position below the fluid level inside the filter housing.

2. The system of claim 1, wherein the purge pipe is not in fluid communication with the wash pipe.

3. The system of claim 2, wherein the purge pipe is fluidly connected to a purge drain pipe.

4. The system of claim 1, wherein the fluid inlet is further connected to an inlet valve and a drain valve, wherein the inlet valve and the drain valve are operably connected to the processor, and wherein the processor controls the opening and closing of the valves.

5. The system of claim 1, wherein the fluid outlet is further fluidly connected to an outlet valve, wherein the outlet valve is operably connected to the processor, and wherein the processor controls the opening and closing of the outlet valve.

6. The system of claim 1, wherein the filter housing further comprising a gas injection inlet for introducing pressurized gas such that the pressurized gas introduced through the gas injection inlet creates turbulence in the filter housing and forces the fluid through the annular space between the wash pipe and the purge pipe.

* * * * *